(12) United States Patent
Rule et al.

(10) Patent No.: US 10,938,643 B2
(45) Date of Patent: Mar. 2, 2021

(54) DISTRIBUTED SENSING SYSTEMS AND NODES THEREFOR

(71) Applicant: Simmonds Precision Products, Inc., Vergennes, VT (US)

(72) Inventors: Benjamin T. Rule, Vergennes, VT (US); Travis Gang, Hinesburg, VT (US); Thomas Henck, Huntington, VT (US); Travis Dement, Burlington, VT (US); Peter J. Carini, Underhill, VT (US); Daniel Hiatt, South Burlington, VT (US); Benjamin D. Mcbride, South Burlington, VT (US); Matthew B. Burleigh, Essex, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 8 days.

(21) Appl. No.: 16/271,319

(22) Filed: Feb. 8, 2019

(65) Prior Publication Data

US 2020/0259708 A1 Aug. 13, 2020

(51) Int. Cl.
*G06F 15/177* (2006.01)
*H04L 12/24* (2006.01)
(Continued)

(52) U.S. Cl.
CPC ........ *H04L 41/0806* (2013.01); *G07C 5/0808* (2013.01); *H04L 12/40* (2013.01);
(Continued)

(58) Field of Classification Search
CPC . H04L 67/34; H04L 41/0813; H04L 41/0869; H04L 41/0879; H04L 41/5054
See application file for complete search history.

(56) References Cited

U.S. PATENT DOCUMENTS 5,005,142 A 4/1991 Lipchak et al.
6,717,541 B1 4/2004 Carter-Lewis et al.
(Continued)

FOREIGN PATENT DOCUMENTS

WO 17/196688 A1 11/2017
WO 18/081802 A1 5/2018

OTHER PUBLICATIONS

Zhang Xinhua et al., "A Self-Reconfiguirable Sensor Network Construction Reaseach in the Paradigm of Internet of Things", Computer Science & Service System. 2012 International Conference on, IEEE, Aug. 11, 2012, pp. 311-314.
(Continued)

*Primary Examiner* — Yves Dalencourt
(74) *Attorney, Agent, or Firm* — Locke Lord LLP; Daniel J. Fiorello; Scott D. Wofsy

(57) ABSTRACT

A control module for a distributed sensor system can include a non-application specific configurable module configured to operate as a function of controller configuration settings data, at least a first memory configured to store the controller configuration settings data, at least one external interface module configured to connect with a master host module of the sensor system to receive updated controller configuration settings data, the control module configured to receive and store the updated controller configuration settings in the first memory thereof via the at least one external interface module, and a subnet interface module configured to connect to one or more configurable sensor nodes on a subnetwork, wherein the control module is configured to control and/or configure the one or more sensor nodes as a function of the controller configuration setting data and receive sensor data from the one or more sensor nodes.

19 Claims, 3 Drawing Sheets

(51) Int. Cl.
  *G07C 5/08* (2006.01)
  *H04L 12/40* (2006.01)
  *H04L 29/08* (2006.01)
  *B64F 5/60* (2017.01)
  *G06F 8/65* (2018.01)

(52) U.S. Cl.
  CPC ............... *H04L 67/12* (2013.01); *B64F 5/60* (2017.01); *G06F 8/65* (2013.01); *H04L 2012/40267* (2013.01)

(56) References Cited

U.S. PATENT DOCUMENTS

| | | | |
|---|---|---|---|
| 7,017,861 | B1 | 3/2006 | Johansson et al. |
| 7,705,725 | B2 | 4/2010 | Matsen et al. |
| 8,144,005 | B2 | 3/2012 | Hu et al. |
| 8,661,923 | B1 | 3/2014 | Willett et al. |
| 8,671,133 | B2 | 3/2014 | Krikorian et al. |
| 8,682,509 | B2 | 3/2014 | Goodrich et al. |
| 9,137,038 | B1 | 9/2015 | Mazuk et al. |
| 9,489,340 | B2 | 11/2016 | Safa-Bakhsh et al. |
| 9,986,411 | B1 * | 5/2018 | Stamatakis ......... H04W 28/021 |
| 10,078,955 | B1 | 9/2018 | Gang et al. |
| 10,178,638 | B1 | 1/2019 | Stamatakis et al. |
| 10,196,152 | B2 | 2/2019 | Gang et al. |
| 2003/0163298 | A1 | 8/2003 | Odom et al. |
| 2006/0020774 | A1 | 1/2006 | Ramos et al. |
| 2012/0101776 | A1 | 4/2012 | Brower et al. |
| 2012/0166789 | A1 | 6/2012 | Baxi et al. |
| 2013/0345489 | A1 * | 12/2013 | Beloussov ............... A61N 5/10 600/1 |
| 2015/0148989 | A1 | 5/2015 | Cooper et al. |
| 2016/0026173 | A1 | 1/2016 | Willis et al. |
| 2017/0067860 | A1 | 3/2017 | Grabill et al. |
| 2017/0244809 | A1 * | 8/2017 | Chae .................. H04L 41/0813 |
| 2018/0004213 | A1 | 1/2018 | Absmeier et al. |

OTHER PUBLICATIONS

Rajan M A et al., "A Self-Reconfigurable Sensor Network Management System for Internet of Things Paradigm", Devices and Communications (ICDECOM), 2011 International Conference on, IEEE, Feb. 24, 2011, pp. 1-5.

Extended European Search Report dated Jun. 23, 2020, issued during the prosecution of European Patent Application No. EP 19216037.2.

* cited by examiner

DISTRIBUTED SENSING SYSTEMS AND NODES THEREFOR

BACKGROUND

1. Field

This disclosure relates to sensing systems, e.g., distributed sensing systems.

2. Description of Related Art

Traditional monitoring systems consist of a single federated unit located in an aircraft compartment connected to a variety of sensors and communication buses. This unit collects, processes and records data from sensors located across the entire aircraft. While these units are highly functional they present challenges for continuous advancement, such as scalability, flexibility, mass reduction, and cost reduction.

Such conventional methods and systems have generally been considered satisfactory for their intended purpose. However, there is still a need in the art for improved sensing systems and nodes therefore. The present disclosure provides a solution for this need.

SUMMARY

A control module for a distributed sensor system can include a non-application specific configurable module configured to operate as a function of controller configuration settings data, at least a first memory configured to store the controller configuration settings data, at least one external interface module configured to connect with a master host module of the sensor system to receive updated controller configuration settings data, the control module configured to receive and store the updated controller configuration settings in the first memory thereof via the at least one external interface module, and a subnet interface module configured to connect to one or more configurable sensor nodes on a subnetwork, wherein the control module is configured to control and/or configure the one or more sensor nodes as a function of the controller configuration setting data and receive sensor data from the one or more sensor nodes. The non-application specific configurable module can be at least partially (e.g., entirely) a software and/or firmware module.

The non-application specific configurable module can include a processing module configured to receive and process sensor data from the sensor nodes, and a command and control module configured to command and control the sensor nodes. The non-application specific configurable module can include the external interface module and the subnet interface module.

The non-application specific configurable module can further include a data manager module configured to manage data flow between the non-application specific configurable module and the first memory and/or data storage on the first memory, and a configuration manager module configured to read the stored configuration settings data from the first memory and to configure at least one of the processing module, the command and control module, the data manager module, or a sensor node on the subnet.

The first memory can be a first partition of a physical memory. The external interface can be configured to connect to at least one external device, for example.

In certain embodiments, the control module can be a partition of a controller. In certain embodiments, the master host module can be a customizable partition of the controller. The control module can be configured to receive controller configuration settings data from the customizable partition or external to the system, update sensor node configuration settings of one or more sensor nodes connected on the subnetwork based on received controller configuration settings data or commands from the customizable partition or external to the system, control the actions of one or more nodes connected on a subnetwork based on received controller configuration settings data or commands from the customizable partition or external to the system, and process sensor data generated by one or more sensor nodes connected on the subnetwork based on the received controller configuration settings or commands from the custom partition or external to the system. The control module can be configured to transfer data to the custom partition or external to the system based on received controller configuration settings or commands from the custom partition or external to the system.

In accordance with at least one aspect of this disclosure, a monitoring system for use in a transportation vehicle can include a master host module comprising a host module configured to output controller configuration settings data, at least one control module connected to the master host module to receive the controller configuration settings, the control module comprising a non-application specific configurable module configured to operate as a function of controller configuration settings data, the control module configured to output sensor node configuration settings data, and a plurality of configurable sensor nodes connected to the control module via a subnetwork to receive the sensor node configuration settings data, the plurality of nodes configured to operate as a function of the sensor node configuration settings data. The control module can be and/or include any suitable control module disclosed herein (e.g., as described above). One or more sensor nodes can be and/or include any suitable sensor node as disclosed herein. Each master host module can be and/or include any suitable master host module disclosed herein, for example.

The system can include a plurality of control modules. The plurality of control modules can be configured to interface with each other via a control network separate from the subnetwork.

In certain embodiments, each control module can be configured to communicate with each sensor node on an individual basis based on sensor node location or sensor node type and/or to broadcast a communication to all sensor nodes or to a plurality of sensor nodes based on sensor node location or sensor node type. Each control module can initiate an action by sending a command to one or more sensor nodes via the subnetwork.

In certain embodiments, each sensor node can collect, process, and store data from internal and/or external sensors on a continuous, periodic, command, or event-driven basis. Each control module can provide one or more sensor nodes with a software and/or firmware image to be programmed with over the subnetwork. Each control module can provide one or more sensor nodes with sensor node configuration settings data specifying characteristics of data acquisitions for which the one or more sensor nodes shall perform for each internal and/or external sensor.

In certain embodiments, each control module can provide one or more sensor nodes with sensor node configuration settings data specifying characteristics of data processing functions which the one or more sensor nodes shall perform for each internal and/or external sensor. Each control module can provide one or more sensor nodes with sensor node configuration settings data specifying characteristics of power consumptions modes the one or more sensor nodes shall be permitted to utilize.

In certain embodiments, each control module can provide one or more sensor nodes with sensor node configuration settings data specifying characteristics of built-in tests (BITs) it shall perform, which monitor a sensing element of each physical sensor connected to each sensor node for faults, failures, or signs of degradation. Each control module can provide one or more sensor nodes with sensor node configuration settings data specifying characteristics of data thresholds which the one or more sensing nodes shall monitor for each internal and/or external sensor.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
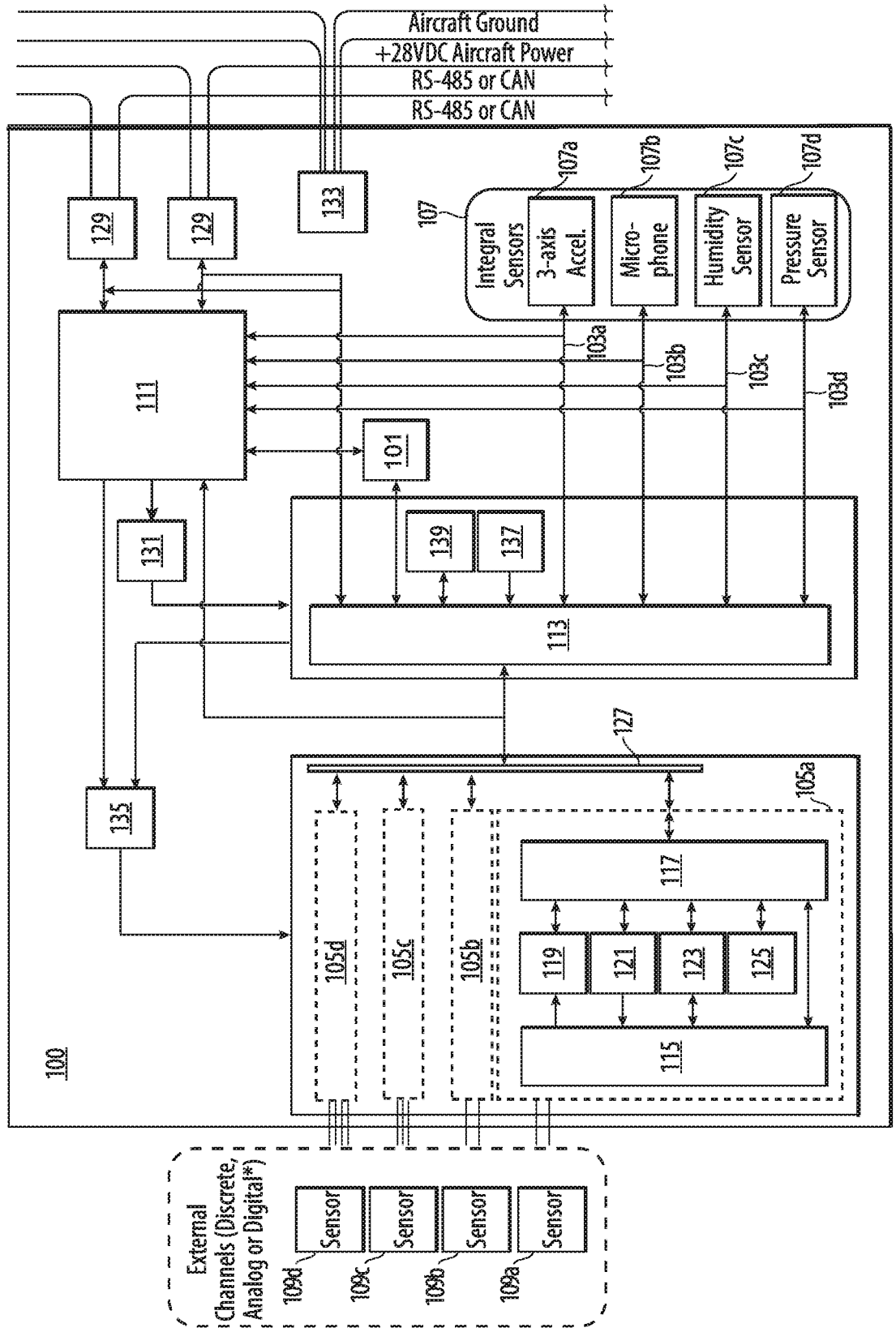
FIG. 1 is a schematic diagram of an embodiment of a sensor node in accordance with this disclosure.
Figure 2:
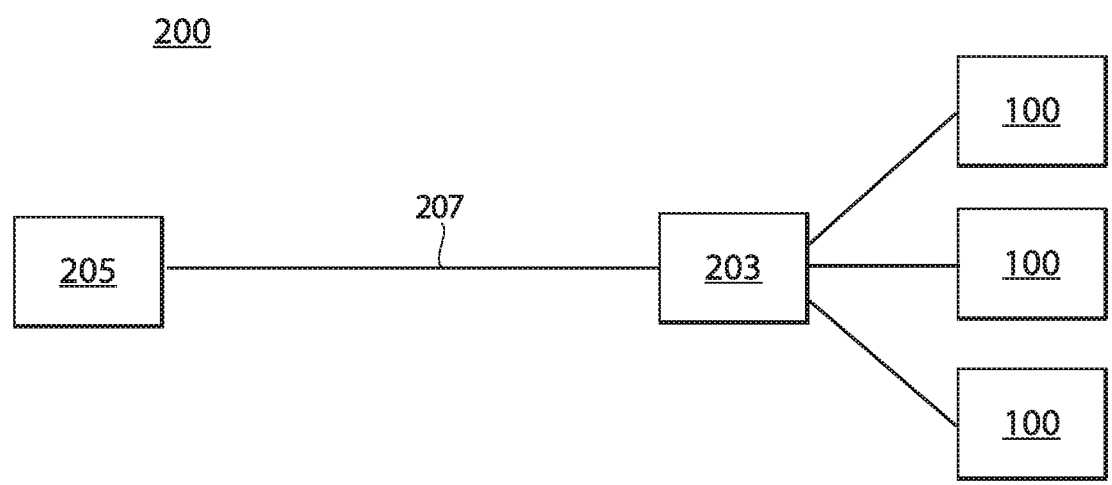
FIG. 2 is a schematic diagram of an embodiment of a distributed sensor system in accordance with this disclosure.

Reference will now be made to the drawings wherein like reference numerals identify similar structural features or aspects of the subject disclosure. For purposes of explanation and illustration, and not limitation, an illustrative view of an embodiment of a sensor node in accordance with the disclosure is shown in FIG. 1 and is designated generally by reference character 100. Other embodiments and/or aspects of this disclosure are shown in FIG. 2. Certain embodiments described herein can be used to, e.g., provide sensor nodes with modifiable configurations to perform any desired function.

Referring to FIG. 1, a sensor node 100, e.g., for a distributed sensing system (e.g., as shown in FIG. 2), can include a physical memory 101 configured to store configuration settings data. The physical memory can include any suitable data storage medium (e.g., a non-transitory computer readable medium such as but not limited to flash memory) as appreciated by those having ordinary skill in the art.

The sensor node 100 can include one or more sensor channels 103a, b, c, d, 105a, b, c, d configured to interface with one or more physical sensors 107a, b, c, d, 109a, b, c, d to receive signals from the one or more physical sensors 107a, b, c, d, 109a, b, c, d. The one or more sensor channels 103a, b, c, d, 105a, b, c, d can include any include any suitable hardware module(s) and/or software module(s) configured to interface with the one or more sensors 107a, b, c, d, 109a, b, c, d.

The sensor node 100 can include one or more configurable logic modules 111, 113 connected to the physical memory 101 and operative to receive the configuration settings data. The one or more configurable logic modules 111, 113 include any suitable hardware module(s) and/or software module(s) that can be configured by the configuration settings data into a logic state to control whether and/or how the one or more one or more configurable logic modules 111, 113 receive and/or processes data from the one or more sensor channels 103a, b, c, d, 105a, b, c, d. The one or more configurable logic modules 111, 113 can include one or more FPGA and/or PLDs, for example. Any other suitable configurable device as appreciated by those having ordinary skill in the art is contemplated herein.

The one or more FPGA and/or PLDs can include a low power FPGA and/or PLD 111 and a normal power FPGA and/or PLD 113 each connected to the physical memory 101. The low power FPGA and/or PLD 111 can be configured to operate a reduced amount of the one or more sensor channels 103a, b, c, d, 105a, b, c, d and/or at reduced sample rate, for example. Any other suitable reduction in function to reduce power is contemplated herein. The normal power FPGA and/or PLD 113 can be configured to operate a full selection of sensor channels and/or at any desired sample rate in accordance with the configuration setting data.

In certain embodiments, the one or more sensor channels 103a, b, c, d, 105a, b, c, d can include one or more integral sensor channels 103a, b, c, d, for example. The sensor node 100 can further include an integral sensor bank 107 having one or more integral physical sensors 107a, b, c, d operatively connected to each of the low power FPGA and/or PLD 111 and the normal power FPGA and/or PLD 113. The integral physical sensors 107a, b, c, d can include one or more of an accelerometer (e.g., 3 axis), a microphone, a humidity sensor, or a pressure sensor, for example. Any other suitable sensor type is contemplated herein.

The one or more sensor channels 103a, b, c, d, 105a, b, c, d can include one or more external sensor channels 105a, b, c, d configured to operatively connect to one or more external physical sensors 109a, b, c, d to receive one or more signals therefrom. In certain embodiments, e.g., as shown, at least one of the one or more external sensor channels 109a, b, c, d can include one or more of a multiplexer (MUX) 115 configured to connect to the one or more external sensors 109a and a channel FPGA and/or PLD 117 connected to low power FPGA and/or PLD 111 and the normal power FPGA and/or PLD 113. At least one of the one or more external sensor channels 109a, b, c, d can include an analog-to-digital converter (ADC) 119 connected between the MUX 115 and the channel FPGA and/or PLD 117, a digital-to-analog converter (DAC) 121 connected between the MUX 115 and the channel FPGA and/or PLD 117, a transceiver 123 connected between the channel FPGA and/or PLD 117 and the MUX 115, and an integral temperature sensor 125 connected to the channel FPGA and/or PLD 117. Any other suitable component(s) for each internal and/or external sensor channel is contemplated herein. As shown, each external sensor channel 105a, b, c, d can be connected to the one or more FPGA and/or PLDs 111, 113 via a bank multiplexer 127, and/or in any other suitable manner as appreciated by those having ordinary skill in the art in view of this disclosure.

The sensor node 100 can include one or more transceivers 129 connected to the one or more FPGA and/or PLDs 111, 113 to receive updated configuration settings data to be stored on the physical memory 101. One or more of the transceivers 129 can be configured to output sensor data, e.g., to a control node further disclosed below.

The sensor node 100 can include a power switch 131 configured to be controlled (e.g., but the low power FPGA and/or PLD 111) to selectively provide power to the normal power FPGA and/or PLD 113. The low power FPGA and/or PLD 111 can be configured to operate the power switch 131 to selectively supply power to the normal power FPGA and/or PLD 111. The sensor node 100 can include a power supply module 133 (e.g., a DC-DC power supply) connected to any suitable portion of the sensor node 100 to supply power thereto (e.g., the FPGA and/or PLDs 111, 113 and/or the one or more sensor channels).

In accordance with at least one aspect of this disclosure, the sensor node 100 can include non-application specific firmware and/or software in the physical memory 101, for example. In certain embodiments, the sensor node 100 can be configured to receive configuration settings and/or operational control commands, perform analog, discrete, and/or digital sensor data acquisitions on one or more sensor channels 103*a*, *b*, *c*, *d*, 105*a*, *b*, *c*, *d* according to received configuration settings data and/or operation control commands, and process data from acquisitions according to received configuration settings data and/or operation control commands.

In certain embodiments, the sensor node 100 can be configured to enter a listening mode according to listening mode configuration setting. In the listening mode, the sensor node 100 can be configured to continually digitize and retain an amount of past sensor data, monitor recorded raw and/or processed sensor data for behavior indicating the occurrence of an event for each predetermined sensor type attached to the one or more sensor channels, and if an event is detected on one or more of the sensor channels, the sensor node 100 can exit the listening mode, retains some or all of the recorded past data, and records a specified amount of additional data. The sensor node 100 can include the one or more external physical sensors 109*a-d* connected to the one or more sensor channels 105*a-d*. The one or more external physical sensors 109*a-d* can be configured to output sensor signals to the one or more sensor channels 105*a-d*. The one or more physical sensors 109*a-d* can include at least one of an ultrasonic sensor configured to provide one or more of ultrasonic sensing capability for use in structural health monitoring. The one or more physical sensors 109*a-d* can include an accelerometer configured to provide acceleration sensing capability, a strain gage, a temperature sensor, a position sensor, a tachometer sensor, an index sensor, a magnetic pickup, a pressure sensor, a load sensor, an optical sensor, a discrete input/output sensor of Ground/Open, or a discrete input/output sensor with a range of 0.01-30 volts/Open. Any other suitable sensor type is contemplated herein. Embodiments of a node 100 can include gyroscopic sensor node configured to measures angular velocity, an optical tracking sensor node configured to measure rotorcraft dynamic blade passing times to determine blade height, an oil sensor node measures oil conductivity, oil dielectric constant, oil temperature, and/or oil level, an optical sensor node interfacing with an optical fiber capable of measuring a range of optical sensor inputs including strain, temperature, acceleration, pressure, position, indexing, force, air speed, and rotational speed. Any other suitable function for any suitable embodiment of a node 100 having any suitable sensors and/or configuration settings is contemplated herein.

As shown, the one or more sensor channels 109*a-d* can include a plurality of sensor channels that are configurable to interface with and collect data from at least one of one or more external analog sensors, one or more digital sensors, or one or more control modules. Any suitable number of sensors and/or channels therefor are contemplated herein. At least one of the sensor channels 105*a-d* can be configured to interface with a discrete control module of a line replaceable unit (LRU) of a transportation vehicle, for example (e.g., a pump, a motor, etc.). The sensor node 100 can be configured to control the discrete control module and thus the actions of the LRU based upon the configuration settings data or an operational command received.

The node 100 can include one or more internal sensors used for monitoring the health and/or usage of the node 100. The node 100 can be configured to provide data back to a controller (e.g., as shown in FIG. 2) over the network data bus according to received configuration settings or operational commands over the network.

Referring additionally to FIG. 2, in accordance with at least one aspect of this disclosure, a distributed sensor node system 200 can include a plurality of distributed sensor nodes, e.g., sensor node 100 as disclosed above, operable to be configured to function based on configuration settings data and to output sensor data. The system 200 can include at least one host 203 operatively connected to each distributed sensor node 100 and configured provide configuration settings data to each of the plurality of sensor nodes 100. The system 200 can include a master host module 205 connected to the host 203, the host 203 configured to receive and compile sensor data from the plurality of sensor nodes 100 and output sensor data on a common line 207 to a master host module 205. Any suitable sensor node (e.g., as described above) and/or any other suitable components for the system 200 are contemplated herein.

In accordance with at least one aspect of this disclosure, a computer implemented method for configuring a sensor node in a distributed sensor network can include receiving sensor node configuration settings data at a configurable logic module of a sensor node, and configuring the configurable logic module from a first logic state to a second logic state based on the configuration setting data to control whether and/or how the one or more one or more configurable logic modules receive and/or processes data from one or more sensor channels. In certain embodiments, the method can include operating the sensor node in a low power mode or a normal power mode as a function of the configuration settings data.

In certain embodiments, the method can include receiving data from one or more sensor channels and processing the data from the one or more sensor channels based on the configuration settings data. In certain embodiments, the method can include selecting which of a plurality of sensor channels to receive data from for processing based on the configuration settings data.

Embodiments can include a monitoring system for use in a transportation vehicle having a controlling node and a plurality of actionable nodes distributed across a network with programmable logic device (PLD) and/or microprocessor with non-application specific firmware and/or software, memory, a custom partition in the PLD and/or microprocessor for hosting application specific firmware and/or software. Embodiments can be remotely configurable to receive configuration settings from the custom partition or external to the system, update the configuration settings of the nodes based on received configured settings or commands received from the custom partition or external to the system, control the actions of a sensor node LRU's line replaceable units connected on a sub-net data bus based on received configured settings or commands received from the custom partition or external to the system, process the data generated by sensor node LRU's based on received configured settings or commands received from the custom partition or external to the system, and/or pass data to the custom partition or external to the system based on received configured settings or commands received from the custom partition or external to the system.

The sensor node, e.g., 100 as described above, can be a configurable device with one or more integrated sensors and/or interfaces to one or more external analog, discrete, or digital sensor. The sensor node can digitize, processes, and stores the sensor(s) data in internal memory. Each sensor node can use volatile and/or non-volatile memory devices to store data and configuration settings. In certain embodiments, the sensor node can retain configuration settings specifying which type of memory device to use to store data. When commanded by the host over the data bus, the sensing node can send the digitized raw and/or processed data for the host using the data bus. The sensor node can have internal memory management to delete expired sensor data. The sensor node can retain a configuration setting specifying, when the memory device exceeds a programmable capacity value indicating it is nearing full capacity, to delete the oldest data only when it has been downloaded by a host and not store new data until sufficient memory resources are available, or to delete the oldest data to replace it with new data as it comes in. As shown in the system 200 of FIG. 2, a multitude of sensor nodes may be used as part of the sensing system.

Figure 3:
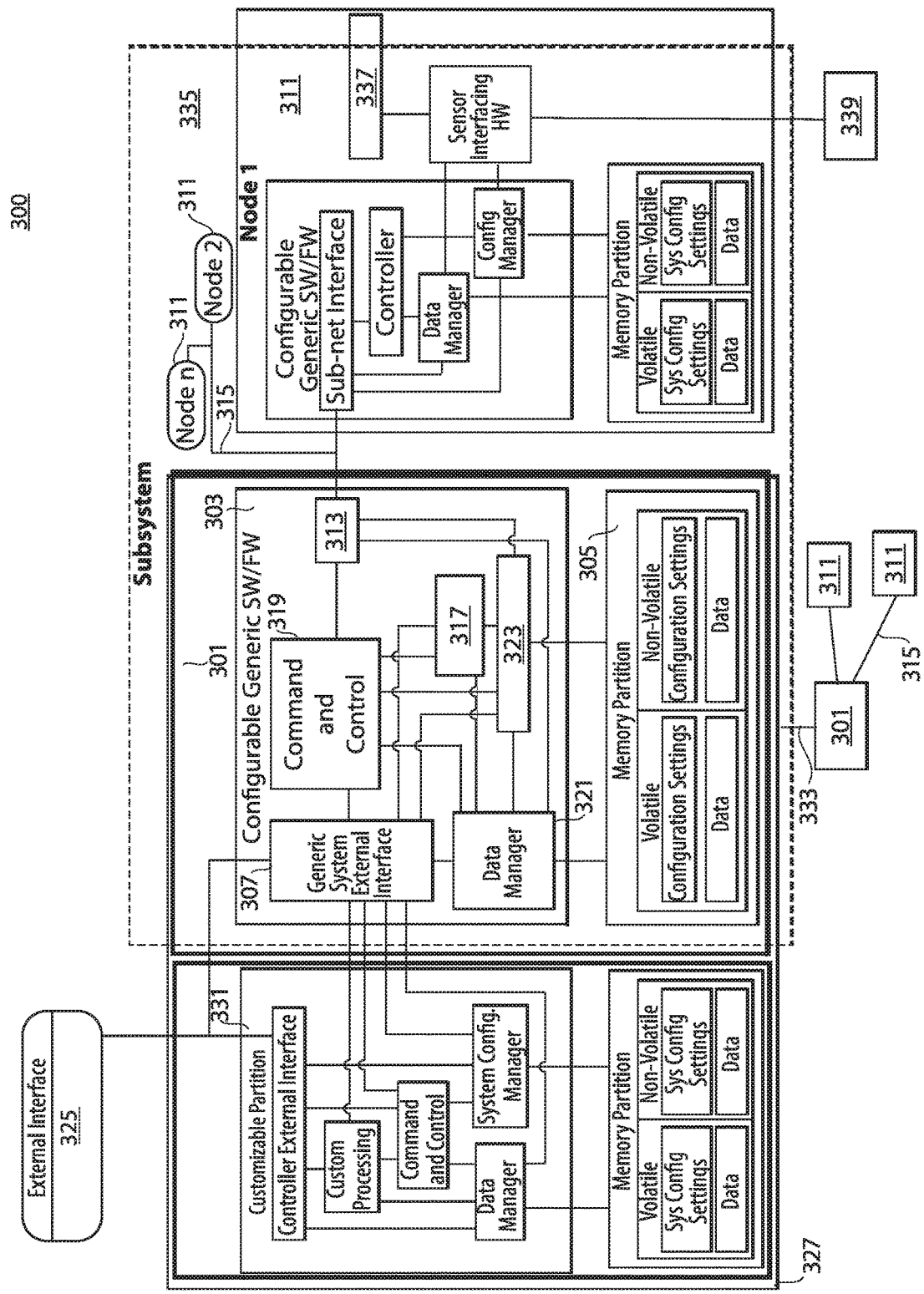
FIG. 3 is a schematic diagram of an embodiment of a monitoring system in accordance with this disclosure.

Referring additionally to FIG. 3, a control module 301 for a distributed sensor system 300 can include a non-application specific configurable module 303 configured to operate as a function of controller configuration settings data, e.g., stored on a memory. The control module 301 can include at least a first memory 305 configured to store the controller configuration settings data.

The control module 301 can include at least one external interface module 307 configured to connect with a master host module 309 of the sensor system 300 to receive updated controller configuration settings data. The control module 301 can be configured to receive and store the updated controller configuration settings in the first memory 305 thereof via the at least one external interface module 307.

The control module 301 can include a subnet interface module 313 configured to connect to one or more configurable sensor nodes 311 on a subnetwork 315. The control module 301 can be configured to control and/or configure the one or more sensor nodes 311 as a function of the controller configuration setting data and receive sensor data from the one or more sensor nodes 311.

The non-application specific configurable module 303 can be at least partially (e.g., entirely) a software and/or firmware module. The non-application specific configurable module 303 can include any suitable hardware and/or software as appreciated by those having ordinary skill in the art configured to perform any function disclosed herein, and/or any other suitable function.

The non-application specific configurable module 303 can include a processing module 317 configured to receive and process sensor data from the sensor nodes 311. The non-application specific configurable module 303 can include a command and control module 319 configured to command and control the sensor nodes 311. The non-application specific configurable module 303 can include the external interface module 307 and the subnet interface module 313 in certain embodiments. Any suitable delineation of modules is contemplated herein.

The non-application specific configurable module 301 can further include a data manager module 321 configured to manage data flow between the non-application specific configurable module 303 and the first memory 305 and/or data storage on the first memory 305. The non-application specific configurable module 301 can include a configuration manager module 323 configured to read the stored configuration settings data from the first memory 305 and to configure at least one of the processing module 317, the command and control module 319, the data manager module 321, or a sensor node 311 on the subnet 315. The external interface 307 can be configured to connect to at least one external device interface 325, for example.

As shown, the first memory 305 can be a first partition of a physical memory. It is contemplated that the first memory 305 can be a standalone hardware module dedicated to the control module 301. In certain embodiments, the control module 301 can be a partition of a controller 327. Also, in certain embodiments, the master host module 309 can be a customizable partition of the controller 327. For example, the control module 301 can be the master host module 309 can be hosted on common hardware. In certain embodiments, the control module 301 and the master host module 309 can be hosted at least partially entirely separately. In certain embodiments, as shown, one or more control modules 301 and a plurality of nodes 311 can form a subsystem 335 as appreciated by those having ordinary skill in the art in accordance with this disclosure.

The control module 301 can be configured to receive controller configuration settings data from the customizable partition or from external to the system 300 (e.g., via external device interface 325), update sensor node configuration settings of one or more sensor nodes 311 connected on the subnetwork 315 based on received controller configuration settings data or commands from the customizable partition or external to the system, control the actions of one or more sensor nodes 311 connected on the subnetwork 315 based on received controller configuration settings data or commands from the customizable partition or external to the system, and process sensor data generated by one or more sensor nodes 311 connected on the subnetwork 315 based on the received controller configuration settings or commands from the custom partition or external to the system 300. The control module 301 can be configured to transfer data to the custom partition or external to the system based on received controller configuration settings or commands from the custom partition or external to the system 300.

In accordance with at least one aspect of this disclosure, the system 300 can be a monitoring system for use in a transportation vehicle can include a master host module 309 comprising a host module 331 configured to output controller configuration settings data. The system can include at least one control module 301 connected to the master host module 309 to receive the controller configuration settings, the control module 301 comprising a non-application specific configurable module 303 configured to operate as a function of controller configuration settings data. The control module 301 can be configured to output sensor node configuration settings data. The monitoring system can include a plurality of configurable sensor nodes 311 connected to the control module via a subnetwork 315 to receive the sensor node configuration settings data. The plurality of nodes 311 can be configured to operate as a function of the sensor node configuration settings data.

The control module can be and/or include any suitable control module disclosed herein (e.g., as described above). One or more sensor nodes can be and/or include any suitable sensor node as disclosed herein. Each master host module can be and/or include any suitable master host module disclosed herein, for example.

As shown, the system 300 can include a plurality of control modules. The plurality of control modules 301 can be configured to interface with each other via a control network 333 separate from the subnetwork 315.

In certain embodiments, each control module 301 can be configured to communicate with each sensor node 311 on an individual basis based on sensor node location or sensor node type. Each control module 301 can additionally or alternatively be configured to broadcast a communication to all sensor nodes 311 or to a plurality of sensor nodes 311 based on sensor node location or sensor node type. Each control module 301 can initiate an action by sending a command to one or more sensor nodes 311 via the subnetwork 315.

In certain embodiments, each sensor node 311 can collect, process, and store data from internal and/or external sensors on a continuous, periodic, command, or event-driven basis. Each control module 301 can provide one or more sensor nodes 311 with a software and/or firmware image to be programmed with over the subnetwork 315. Each control module 301 can provide one or more sensor nodes 311 with sensor node configuration settings data specifying characteristics of data acquisitions for which the one or more sensor nodes 311 shall perform for each internal sensor 337 and/or external sensor 339.

In certain embodiments, each control module 301 can provide one or more sensor nodes 311 with sensor node configuration settings data specifying characteristics of data processing functions which the one or more sensor nodes 311 shall perform for each internal sensor 337 and/or external sensor 339. Each control module 301 can provide one or more sensor nodes 311 with sensor node configuration settings data specifying characteristics of power consumptions modes the one or more sensor nodes 311 shall be permitted to utilize.

In certain embodiments, each control module 301 can provide one or more sensor nodes 311 with sensor node configuration settings data specifying characteristics of built-in tests (BITs) it shall perform, which monitor a sensing element of each physical sensor connected to each sensor node 311 for faults, failures, or signs of degradation. Each control module 301 can provide one or more sensor nodes 311 with sensor node configuration settings data specifying characteristics of data thresholds which the one or more sensor nodes 311 shall monitor for each internal sensor 337 and/or external sensor 339.

As described above, each control module 301 can include a memory partition hosting configuration settings, and one or more modules that read configuration settings. A configuration manager can sort/change configuration settings (e.g., from a master host). A generic system external interface 307 can talk to the master host module 309 for new settings, etc. Processing in control module 301 can be more intensive data processing than in the sensor nodes 311 because the control module 301 can have processing software, whereas sensor nodes 311 may only have basic firmware. In certain embodiments, a sensor nodes function is to sense and acquire data from outside world using sensors, and a control modules function is to coordinate with sensor nodes on subnet and use/process/organize data (e.g., controller trigger acquisition from other sensors on subnetwork) based on a sensed event by one sensor node and communicate with master host module.

Embodiments save wire weight because instead of having wires connected to each sensor from host module, there can be one common data line to all control modules and smaller lengths to sensor nodes to create the subnetwork. Embodiments also reduces latency by processing at one or more of the control modules in the subsystem.

Embodiments provide configurable control modules and sensing nodes, for example. In certain embodiments, all sensor nodes and control modules can include the same logic hardware parts, with only varying configurable software/firmware. Configurable sensor nodes and control modules allow changing of their settings (e.g., for ADC, MUX, input channel) and thus their functions, without changing certified firmware/software. Each software/firmware certification can thus apply to a range of options for each sensor node/control module/controller.

Embodiments include a monitoring system for use in a transportation vehicle (e.g., an aircraft) having a controlling node and a plurality of actionable nodes distributed across a network. Any other suitable use is contemplated herein. Embodiments include a method of collecting transportation vehicle (e.g., aircraft) parametric, environmental, performance, diagnostic, or other data from a daisy-chained system of sensor nodes on a data bus commanded by a controlling node, with the controlling node communicating with a plurality of additional controlling nodes on a separate daisy-chained data bus. Each control module can be the primary controller of a plurality of sensor nodes on a subnetwork data bus. Each sensor node can collect, processes, and stores data from internal or external sensors on a continuous, periodic, or event-driven basis.

Any network and/or subnetwork disclosed herein can include any suitable wire, cables, data bus, communication protocol, and may be direct connections or indirect (e.g., through a router), and can include any suitable components as appreciated by those having ordinary skill in the art.

Each sensor node can be a configurable device with integrated sensors and/or interfaces to one or more external physical sensor with an analog, discrete, or digital output. Each sensor node can digitizes, process, and store the sensor data in internal memory. Each sensor node can use volatile and/or non-volatile memory devices to store data and configuration settings. Each sensor node can contain configuration settings specifying which type of memory device to use to store data. When commanded by the control module over the subnetwork data bus, the sensor node sends the digitized raw and/or processed data for the control module using the data bus. The sensor node can have internal memory management to delete expired sensor data. The sensor node can include a configuration setting specifying, when the memory device exceeds a programmable capacity value indicating it is nearing full capacity, to delete the oldest data only when it has been downloaded by a controlling node and not store new data until sufficient memory resources are available, or to delete the oldest data to replace it with new data as it comes in. As disclosed above, any suitable number, e.g., a multitude, of sensor nodes may be used as part of the sensing system.

In certain embodiments, a plurality of control modules and sensor nodes on a plurality of subnetworks can perform identical functions as a redundant measure to comply with high reliability considerations.

In certain embodiments, a plurality of host modules, control modules, and sensor node subnetworks can perform identical functions as a redundant measure to comply with high reliability considerations. Each host module and/or control module and sensor node can perform a configurable set of built-in test (BIT) at startup, as initiated by a host module and/or control module, or on a continuous or periodic basis, for example. The BIT may be performed on circuit card assembly components within the host module and/or control module or sensor node. The BIT may be performed on communication circuitry and communication data integrity. The BIT may be performed on external channel circuitry and channel data integrity. The BIT may be performed on electrical power circuitry and integrity. The BIT results may be stored by the host and/or node according to a configuration setting. The number of BIT failure results, number of BIT pass results, as well as the storage location of the BIT results can be configurable. The node BIT results may be transmitted to the host according to a configuration setting, either immediately upon detection or upon a BIT status request from a host module and/or control module, for example. The BIT results may initiate a configurable set of actions by the host module and/or control module or node.

In certain embodiments, each host module and/or control module can perform time synchronization of the sensor nodes in its subnetwork. The host module and/or control module can transmit a system time to the sensor node(s) via the data bus on a periodic or event-driven basis.

The sensor nodes can update their internal system time to match each system time update it receives from the host module and/or control module. All subsequent timestamped data uses the most recently received system time. Each host module and/or control module and sensor node can use a predefined set of power consumption modes optimized to its current tasks. The nodes may toggle on or off circuit card assembly components according to the current power mode, e.g., FPGA and/or PLDs, processors, memory devices, internal sensors, transceivers, microprocessors, circuit card heating elements, analog-to-digital converters (ADCs), digital-to-analog converters (DACs), etc. The sensor nodes may autonomously transition to the lowest necessary power mode based on its current set of tasks. The host module and/or control module may command the sensor node(s) to operate in a particular power mode. The sensor nodes may have a configuration setting specifying the power modes available for use during operation.

Embodiments of a system can be used to perform Health and Usage Monitoring (HUMS) in aircraft which could include Rotor Track and Balance, Mechanical Diagnostics and Vibration Diagnostics. The system can be used to perform Prognostic and Health Management in aircraft, for example. The data resulting from the system can be used for cloud based data analytics. The communication methods of the system can include RS-485, CAN, Ethernet (e.g., for between controllers), optical, wireless, and any other suitable aircraft protocols, for example.

Embodiments include actionable nodes for use in a monitoring system in a transportation vehicle having a plurality of actionable nodes distributed across a network with each node.

Prior technologies relied on a single federated located in the aircraft to collect and process data from all pertinent data from sensors and communication buses. These systems are heavy, costly, and not easily scalable for a particular application. A distributed system of host and sensor nodes allows for a system to be design for a particular application with a wide range of sensor types, optimizing system size and cost for that application. The system is also expandable over time. Embodiments can be applicable for any distributed sensing system having daisy-chained primary and secondary (and additional) devices, for example.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer programs according to embodiments of this disclosure.

It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A control module for a distributed sensor system, comprising:
   a non-application specific configurable module configured to operate as a function of controller configuration settings data;
   at least a first memory configured to store the controller configuration settings data;
   at least one external interface module configured to connect with a master host module of the sensor system to receive updated controller configuration settings data, the control module configured to receive and store the updated controller configuration settings in the first memory thereof via the at least one external interface module wherein the control module is a partition of a controller, and wherein the master host module is a customizable partition of the controller; and
   a subnet interface module configured to connect to one or more configurable sensor nodes on a subnetwork, wherein the control module is configured to control and/or configure the one or more sensor nodes as a function of the controller configuration setting data and receive sensor data from the one or more sensor nodes.

2. The control module of claim 1, wherein the non-application specific configurable module is at least partially a software and/or firmware module.

3. The control module of claim 1, wherein the non-application specific configurable module includes:
   a processing module configured to receive and process sensor data from the sensor nodes; and
   a command and control module configured to command and control the sensor nodes.

4. The control module of claim 3, wherein the non-application specific configurable module includes the external interface module and the subnet interface module.

5. The control module of claim 4, wherein the non-application specific configurable module further includes:
   a data manager module configured to manage data flow between the non-application specific configurable module and the first memory and/or data storage on the first memory; and
   a configuration manager module configured to read the stored configuration settings data from the first memory and to configure at least one of the processing module, the command and control module, the data manager module, or a sensor node on the subnet.

6. The control module of claim 1, wherein the first memory is a first partition of a physical memory.

7. The control module of claim 1, wherein the external interface is configured to connect to at least one external device.

8. The control module of claim 1, wherein the control module is configured to receive controller configuration settings data from the customizable partition or external to the system, update sensor node configuration settings of one or more sensor nodes connected on the subnetwork based on received controller configuration settings data or commands from the customizable partition or external to the system, control the actions of one or more nodes connected on a subnetwork based on received controller configuration settings data or commands from the customizable partition or external to the system, and process sensor data generated by one or more sensor nodes connected on the subnetwork based on the received controller configuration settings or commands from the custom partition or external to the system.

9. The control module of claim 8, wherein the control module is configured to transfer data to the custom partition or external to the system based on received controller configuration settings or commands from the custom partition or external to the system.

10. A monitoring system for use in a transportation vehicle, comprising:
    a master host module comprising a host module configured to output controller configuration settings data;
    at least one control module connected to the master host module to receive the controller configuration settings, the control module comprising a non-application specific configurable module configured to operate as a function of controller configuration settings data, the control module configured to output sensor node configuration settings data, wherein the control module is a partition of a controller, and wherein the master host module is a customizable partition of the controller; and a plurality of configurable sensor nodes connected to the control module via a subnetwork to receive the sensor node configuration settings data, the plurality of nodes configured to operate as a function of the sensor node configuration settings data.

11. The system of claim 10, wherein the control module includes:

at least a first memory configured to store the controller configuration settings data;

at least one external interface module configured to connect with a master host of the sensor system to receive updated controller configuration settings data, the control module configured to receive and store the updated controller configuration settings in the first memory thereof via the at least one external interface module; and a subnet interface module configured to connect to the configurable sensor nodes on the subnetwork, wherein the control module is configured to control and/or configure the one or more sensor nodes as a function of the controller configuration setting data and receive sensor data from the one or more sensor nodes.

12. The system of claim 10, comprising a plurality of control modules, wherein the plurality of control modules are configured to interface with each other via a control network separate from the subnetwork.

13. The system of claim 12, wherein each control module is configured to communicate with each sensor node on an individual basis based on sensor node location or sensor node type and/or to broadcast a communication to all sensor nodes or to a plurality of sensor nodes based on sensor node location or sensor node type.

14. The system of claim 13, wherein each control module initiates an action by sending a command to one or more sensor nodes via the subnetwork.

15. The system of claim 14, wherein each sensor node collects, processes, and stores data from internal and/or external sensors on a continuous, periodic, command, or event-driven basis.

16. The system of claim 10, wherein each control module provides one or more sensor nodes with a software and/or firmware image to be programmed with over the subnetwork.

17. The system of claim 10, wherein each control module provides one or more sensor nodes with sensor node configuration settings data specifying characteristics of data acquisitions for which the one or more sensor nodes shall perform for each internal and/or external sensor.

18. The system of claim 10, wherein each control module provides one or more sensor nodes with sensor node configuration settings data specifying characteristics of data processing functions which the one or more sensor nodes shall perform for each internal and/or external sensor.

19. The system of claim 10, wherein each control module provides one or more sensor nodes with sensor node configuration settings data specifying characteristics of power consumptions modes the one or more sensor nodes shall be permitted to utilize.

* * * * *